(No Model.)

B. HANSON.
HARNESS SADDLE.

No. 583,289. Patented May 25, 1897.

WITNESSES:
George J. Bond.
John Mathison

INVENTOR
Bernhard Hanson,
BY
John D. Hyer,
ATTORNEY.

UNITED STATES PATENT OFFICE.

BERNHARD HANSON, OF CLEVELAND, OHIO.

HARNESS-SADDLE.

SPECIFICATION forming part of Letters Patent No. 583,289, dated May 25, 1897.

Application filed June 9, 1896. Serial No. 594,848. (No model.)

*To all whom it may concern:*

Be it known that I, BERNHARD HANSON, a citizen of the United States, residing at Cleveland, in the county of Cuyahoga and State of Ohio, have invented certain new and useful Improvements in Harness-Saddles; and I do hereby declare the following to be a full, clear, and exact description of the invention, such as will enable others skilled in the art to which it appertains to make and use the same.

The invention consists of a harness or gig saddle having an arched tree hinged or pivoted to plates secured on the top surface of the pads and provided with a check-hook on the tree and terrets secured on the plates.

The object of the invention is to provide a neat, cheap, and durable saddle in which the parts are easily assembled, that will fit nearly all horses, and prevent galling of the animal.

The following specification is a full, clear, and exact description of the invention, reference being had to the accompanying drawings, which form a part thereof, and in which—

Figure 1:
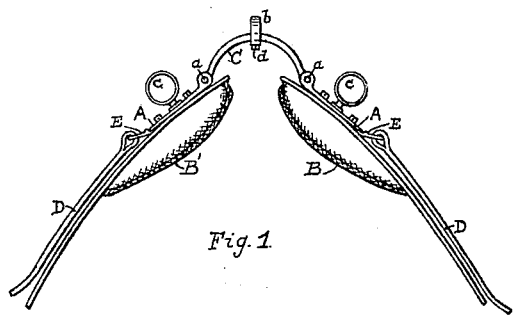
Figure 2:
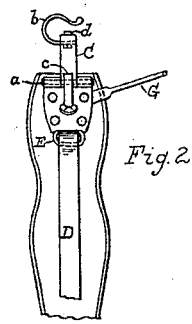
Figure 3:
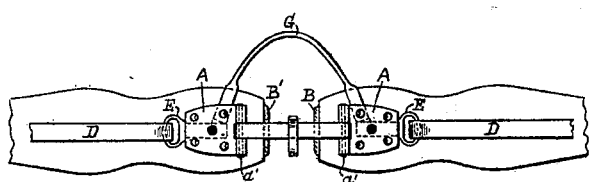
Figure 4:
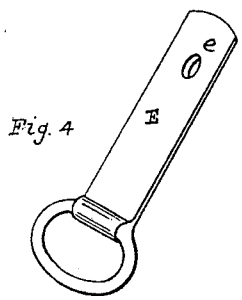
Figures 5, 6:
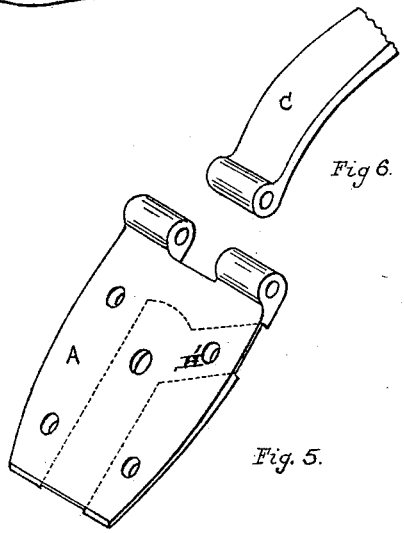

Figure 1 is a front elevation of a completed saddle. Fig. 2 is a side elevation thereof. Fig. 3 is a plan view, and Figs. 4, 5, and 6 are detail views to be hereinafter referred to.

Like reference-letters indicate corresponding parts in different views.

A A are the pad-plates. They are made of metal and may be plated or otherwise ornamented. They are oblong in form and somewhat narrower than the pads to which they are to be applied. The upper ends of the plates are formed with butt-joints, by means of which they are hinged or pivoted to the tree. The plates are provided with holes or apertures for the passage of screws by which they are secured to the pads and also with holes for the terrets. The under faces of the plates are formed with longitudinal grooves or recesses H, and are also preferably formed with angular lateral grooves H'. The purposes of these grooves will be presently explained.

B B' are the pads. They are of any ordinary or preferred construction, being wider and heavier for the common harness-saddle and narrower and lighter for a gig-saddle for light harness. The pads are provided with nuts on the insides thereof in the usual manner to receive the screws for securing the plates A to them and also for securing the terret-screws.

C is the tree. It is arch-shaped or substantially semicircular in form, and its ends are formed to fit the joint on the tops of the pad-plates, and the tree is pivoted to said plates by means of rods or pintles $a$ $a$, which are passed through lateral apertures in the ends of the plates and tree in a well-known manner in forming a butt-joint.

The tree C is provided at the top of its arch in front with a check-hook, which is preferably secured thereto. It may also be provided on the rear side with a loop for crupper-strap.

While I prefer the means just described for pivoting the tree and plate, any other suitable form of articulation may be adopted.

D is the back-strap, which is of the usual form. It is secured at its upper end with a back-strap loop E. This loop is formed with a tang or tongue (see Fig. 4) to fit the groove H on the under side of the pad-plate A. It also has near the end of the tongue a hole or aperture $e$, which registers with the hole in the plate A for the terret, so that the passage of the terret through the pad-plate and through the hole $e$ in front of the back-strap loop E secures the latter in position when the parts are assembled.

It will be seen that the mountings on the saddle may be changed at pleasure in a very simple manner without taking the saddle to pieces.

When it is desired to use a flexible crupper-strap loop, as is sometimes preferable, to keep the saddle in position, angular lateral grooves H' are formed on the under side of the pad-plate, and the flat ends of the crupper-strap loop G are inserted therein and secured to the plate. The strap G may also be attached under the pad-plate without the groove H' therein; but I prefer to construct the plate with the groove, as it makes a much neater and stronger finish. For lighter saddles it is also sometimes desirable to form the back-strap loop as a part of the pad-plate or pivot the same to the ends of the plate, both of which forms would be within the scope of the invention.

The plates A are secured on the top surfaces of the pad, so that the tree and plates are readily attached to almost any pad, and, as before stated, the mountings comprising the check-hook, terrets, and even the back-strap loop are readily removable and interchangeable.

The saddle adjusts itself to almost any size animal and by virtue of its construction not only prevents galling, but is also well adapted for use on an animal where chafing and galling already exists on account of the use of badly-constructed saddles. The strain on the animal is also reduced to the minimum, since the bearings of the pad fall where the anatomy of the horse is best adapted to receive them, and thus enables him to draw the load with more ease and without danger of injury.

Having thus fully described the invention, what I claim as new, and desire to secure by Letters Patent, is—

1. In a harness-saddle, an arch-shaped tree having a check-hook at its apex and pivoted at its ends to small flat pad-plates carrying the terrets and secured near the top of the pads and on the upper and outer surface thereof, substantially as described.

2. A harness-saddle provided with suitable pads, an arch-shaped tree having a check-hook at its apex and small flat pad-plates to which the tree is pivoted and which plates are secured to the top surfaces of the pads and carry the terrets, and loops for back-band straps adjacent to the terrets, substantially as described.

3. A harness-saddle provided with suitable pads, an arch-shaped tree having a check-hook at its apex, and flat pad-plates to which the tree is pivoted and which plates are secured to the upper surfaces of the pad and carry the terrets, and loops for the back-band straps detachably secured in grooves or recesses on the under sides of the pad-plates, substantially as described.

4. A harness-saddle provided with suitable pads, an arch-shaped tree having a check-hook at its apex and flat pad-plates to which the tree is pivoted and which plates are secured to the upper surfaces of the pad and carry the terret; loops for the back-straps detachably secured in grooves or recesses on the under surfaces of the pad-plate and a crupper-strap loop, substantially as described.

In testimony whereof I affix my signature in presence of two witnesses.

BERNHARD HANSON.

Witnesses:
JOHN MATHISON,
GEO. M. COPENHAVER.